United States Patent
Hashimoto et al.

(10) Patent No.: US 7,142,694 B2
(45) Date of Patent: Nov. 28, 2006

(54) IMAGE PROCESSING APPARATUS

(75) Inventors: Manabu Hashimoto, Tokyo (JP);
Kentaro Hayashi, Tokyo (JP);
Kazuhiko Sumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 442 days.

(21) Appl. No.: 10/493,434

(22) PCT Filed: Jul. 26, 2002

(86) PCT No.: PCT/JP02/07632

§ 371 (c)(1),
(2), (4) Date: Apr. 23, 2004

(87) PCT Pub. No.: WO2004/012142

PCT Pub. Date: Feb. 5, 2004

(65) Prior Publication Data

US 2005/0013488 A1    Jan. 20, 2005

(51) Int. Cl.
*G06K 9/00* (2006.01)
*B66B 1/28* (2006.01)
*G05B 15/00* (2006.01)

(52) U.S. Cl. .................. 382/106; 382/118; 187/247
(58) Field of Classification Search ................ 382/106, 382/118; 187/247
See application file for complete search history.

(56) References Cited

U.S. PATENT DOCUMENTS 5,323,470 A * 6/1994 Kara et al. .................. 382/103
7,079,669 B1 * 7/2006 Hashimoto et al. ......... 382/118
2002/0191819 A1 12/2002 Hashimoto et al.

FOREIGN PATENT DOCUMENTS

| JP | 4-286596   |   | 10/1992 |
|----|------------|---|---------|
| JP | 5-147835   | * | 6/1993  |
| JP | 6-92563    |   | 4/1994  |
| JP | 9-145362   |   | 6/1997  |
| JP | 10-232985  |   | 9/1998  |
| JP | 2001-351190|   | 12/2001 |
| JP | 2002-197463|   | 7/2002  |

* cited by examiner

*Primary Examiner*—Joseph Mancuso
*Assistant Examiner*—Damon Conover
(74) *Attorney, Agent, or Firm*—Leydig, Voit & Mayer, Ltd.

(57) ABSTRACT

An image processor includes an imaging unit that captures an image of a target area, a face region extraction unit that extracts a face region, which corresponds to a face of a person, from the image captured by the imaging unit, a distance estimation unit that estimates a distance from the imaging unit to each position of the image captured by the imaging unit, a distance distribution calculation unit that sets up a distance estimation area below the face region by a predetermined distance and calculates distance distribution from the imaging unit in the distance estimation area, using the distance estimated by the distance estimation unit, and a wheelchair presence determination unit that determines whether a person corresponding to the face region extracted is sitting in a wheelchair, by comparing the distance from the imaging unit of the face region estimated by the distance estimation unit with the distance distribution in the distance estimation area.

8 Claims, 14 Drawing Sheets

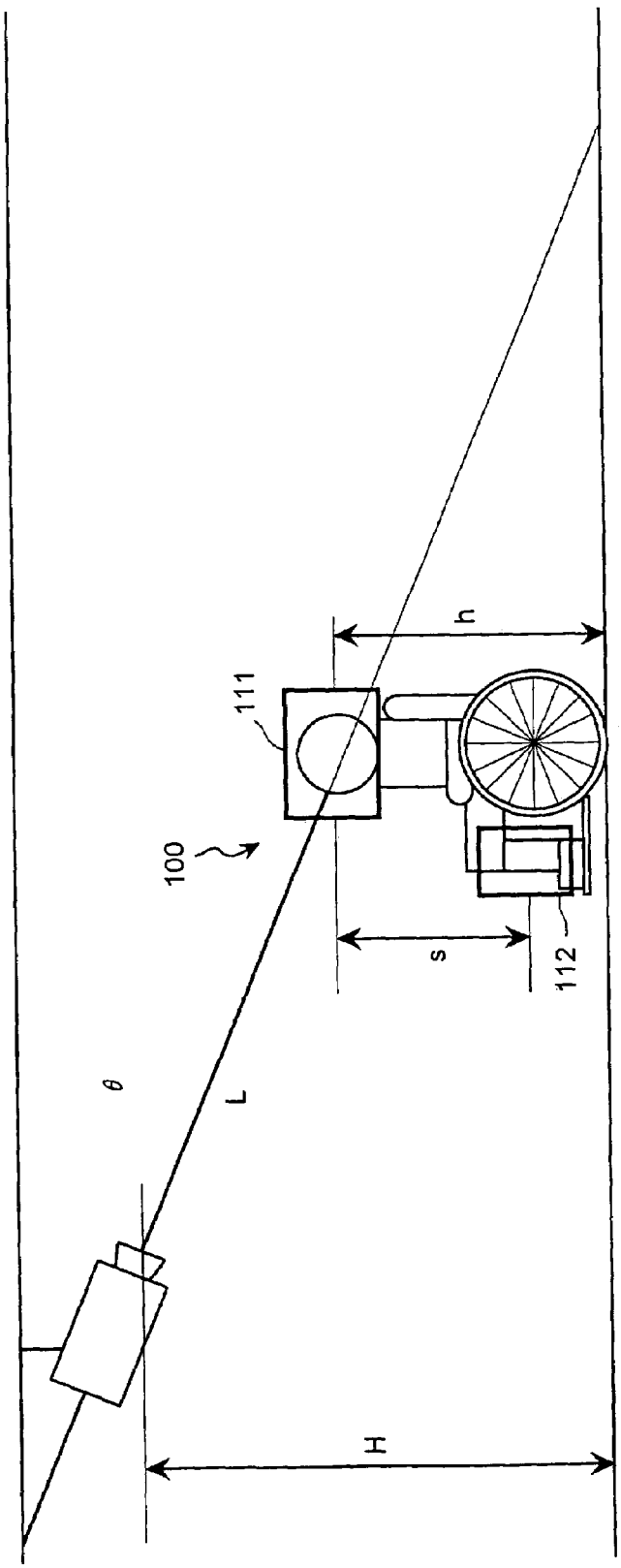

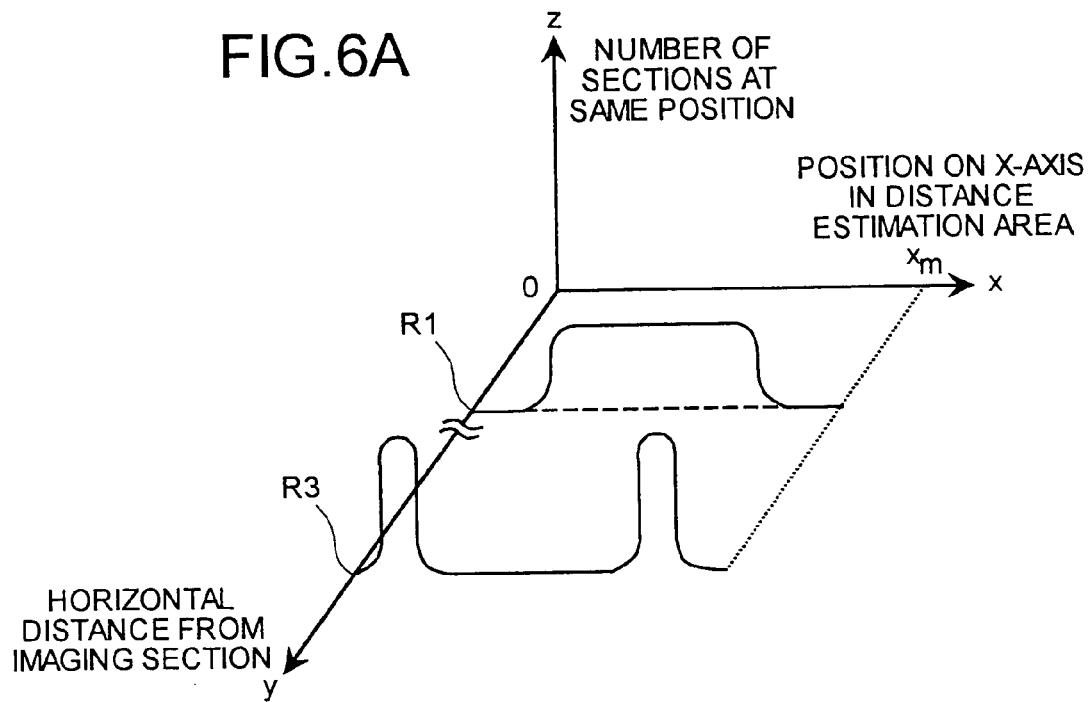
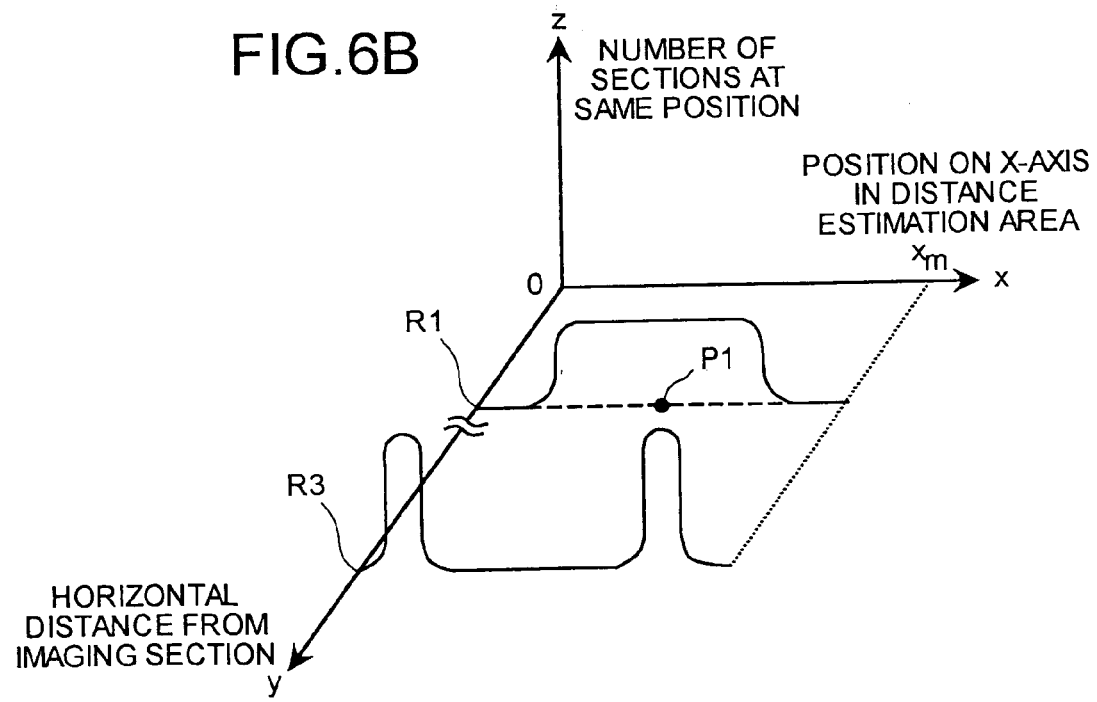

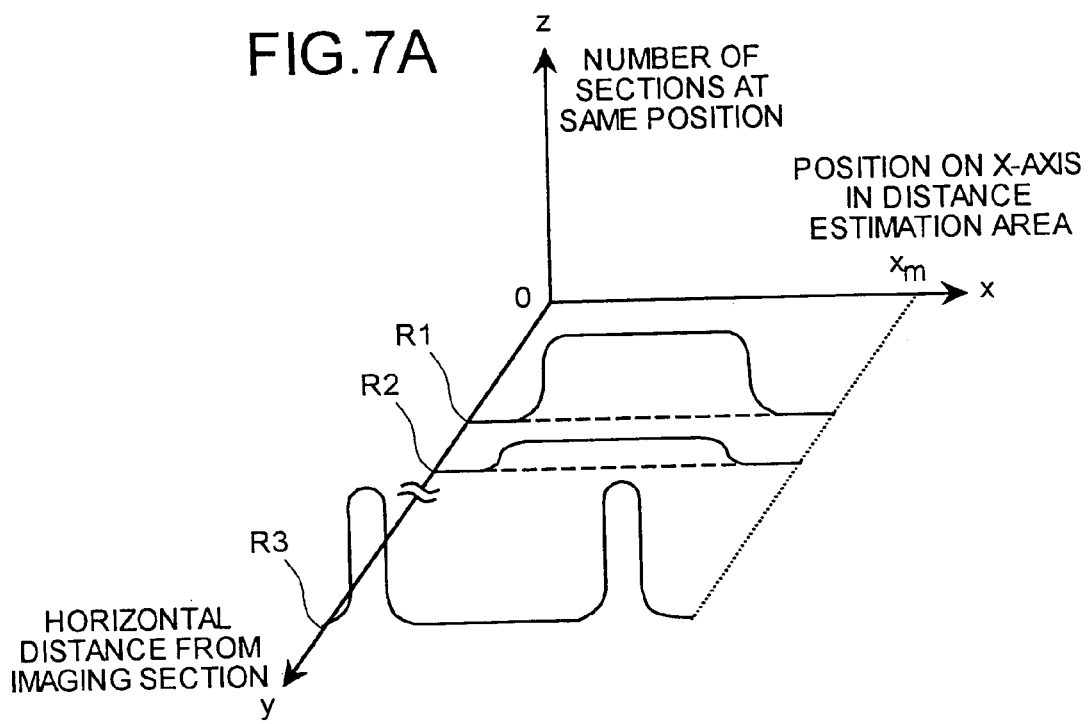
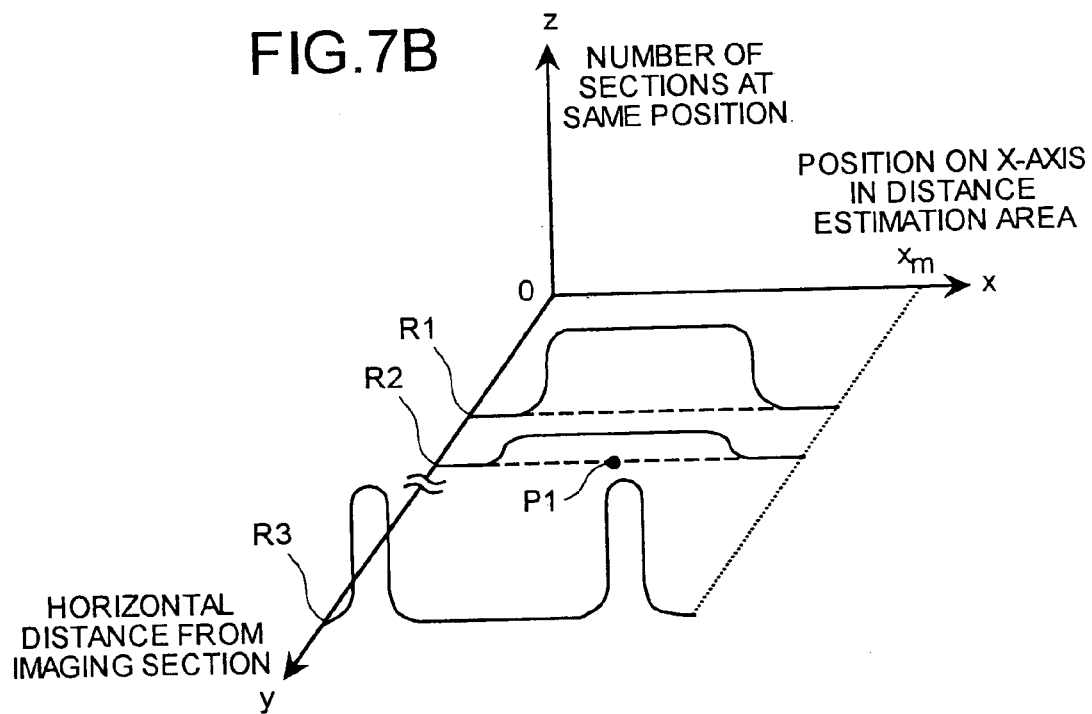

IMAGE PROCESSING APPARATUS

TECHNICAL FIELD

The present invention relates to an image processor that can automatically recognize the state of passengers in an elevator or the like, specifically, whether there is a passenger sitting on a wheelchair.

BACKGROUND ART

A better service can be provided to disabled persons if it can be detected that there is a disabled person who is using a wheelchair (hereinafter, "wheelchair user") in an elevator cage. For example, if there is a wheelchair user in the elevator, the operation mode of the elevator may be changed from a normal operation mode, which is suitable for able-bodied persons, to a wheelchair operation mode, which is safer and more comfortable than the normal operation mode.

For example, in the wheelchair operation mode, the elevator cage may be operated at a lower speed, may be made to land more accurately and smoothly than that in the normal operation mode. When there is no wheelchair user in the elevator cage, the elevator cage may be operated at a faster speed and more roughly to give importance to the operating efficiency of the elevator than the safety or the comfort.

Conventionally, when a wheelchair user gets on an elevator, he/she pushes a button to change the operation mode from the normal operation mode to the wheelchair operation mode.

However, sometimes the wheelchair user may not be able to push the button, for example, when the elevator cage is full with passengers. Sometimes the wheelchair user may have to request someone to press the button for him/her. On the contrary, a child or even an adult able-bodied person may unknowingly or accidentally push the button to resultantly lower the operating efficiency of the elevator although there is no wheelchair user in the elevator cage. Thus, it will be more convenient if the normal operation mode can be changed to the wheelchair operation mode when there is a wheelchair user in the elevator cage.

To automatically change the operation mode, it is necessary to detect whether there is a wheelchair user in the elevator cage. One approach to detect whether there is a wheelchair user in the elevator is to use an image processor. A number counting apparatus that performs image recognition of passengers in an elevator is disclosed in, for example, Japanese Patent Application Laid-Open No. H6-92563, though it does not detect whether there is a wheelchair user in the elevator.

FIG. 14 is a block diagram of the number counting apparatus. The number counting apparatus includes an imaging unit 901, an image processing unit 902, a neural network 903, and a number determination unit 904. The imaging unit 901 is installed on the ceiling located above the passengers' heads so as to take pictures vertically downward, in the elevator cage or in the elevator hall.

First, an image of the situation in the elevator cage or in the elevator hall is captured by the imaging unit 901, and input to the image processing unit 902. FIG. 15 is an example of an image captured by the imaging unit 901. This image includes three persons 906 to 908. The image processing unit 902 generates a differential image by performing differential processing for performing binarization, based on an absolute value of a difference between respective pixel values, in the captured image and in the background image obtained by photographing the inside of the elevator cage or the elevator hall, in the state that there is no person therein, and clarifies a human region. The image processing unit 902 divides the binarized differential image into a plurality of blocks having different areas, calculates the proportion of the human region occupying in each block, and inputs the calculated result to the neural network 903 as input data.

The neural network 903, which has been allowed to learn beforehand, processes the input data, and the output signal is input to the number determination unit 904. The number determination unit 904 determines the number from the output signal from the neural network 903, and transmits or outputs the result to other controllers and the like according to the purpose.

However, because the image processor captures an image of a person from above, an image that is much smaller than when the image is captured from a side is obtained. Because the image is small, it cannot be used surely to determine whether the person in the image is a wheelchair user.

Moreover, number of persons can not be accurately distinguished if a few persons are standing close to each other. Because the persons can not be distinguished, it cannot be surely determine whether there is a wheelchair user.

It is an object of the present invention to provide an image processor that can distinguish persons, even if there are a plurality of persons standing close to each other, and can determine whether there is a wheelchair user.

DISCLOSURE OF THE INVENTION

An image processor according to an aspect of the present invention includes an imaging unit that captures an image in a target area; a face region extraction unit that extracts a face region, which corresponds to a face of a person, from the image captured by the imaging unit; a distance estimation unit that estimates a distance from the imaging unit to each position of the image captured by the imaging unit; a distance distribution calculation unit that sets up a distance estimation area, in the image captured, below the face region by a predetermined distance and calculates distance distribution from the imaging unit in the distance estimation area, using the distance estimated by the distance estimation unit; and a wheelchair presence determination unit that determines whether a person corresponding to the face region extracted is sitting on a wheelchair, by comparing the distance from the imaging unit of the face region estimated by the distance estimation unit with the distance distribution in the distance estimation area.

According to this aspect, the imaging unit captures the image in the target area, and the face region extraction unit extracts the human face region from the image captured by the imaging unit. Further, the distance estimation unit estimates a distance from the imaging unit to each position of the image captured by the imaging unit. The distance distribution calculation unit then sets up the distance estimation area below the extracted human face region by a predetermined distance, and calculates distance distribution from the imaging unit in the distance estimation area, using the distance estimated by the distance estimation unit. The wheelchair presence determination unit compares the distance from the imaging unit of the face region estimated by the distance estimation unit with the distance distribution in the distance estimation area, to determine whether a person having the face region is sitting on a wheelchair.

An image processing apparatus according to the next invention, in the image processing according to the above aspect, includes a change area detection unit that generates a differential image of an image captured by the imaging unit, and a background image which is an image of the target area when there is no one present in the target area, and extracts a change area, which corresponds to an area where there is a change, from the differential image, wherein the face region extraction unit extracts a face region from the change area extracted by the change area detection unit.

According to this aspect, the change area detection unit generates a differential image from the image captured by the imaging unit, and a background image in which the object in the target area is not present, and extracts an area where there is a change, based on the generated differential image. The face region extraction unit extracts the face region only in the area where there is a change, extracted by the change area detection unit.

In an image processing apparatus according to the next invention, in the image processing according to the above aspect, the distance estimation unit is a scanning type laser range finder.

According to this aspect, the scanning type laser range finder is used as the distance estimation unit.

An image processing apparatus according to the next invention, in the image processing according to the above aspect, includes a change area detection unit that generates a differential image of an image captured by the imaging unit, and a background image which is an image of the target area when there is no one present in the target area, and extracts a change area, which corresponds to an area where there is a change, from the differential image, wherein the face region extraction unit extracts a face region from the change area extracted by the change area detection unit.

According to this aspect, the change area detection unit generates a differential image from the image captured by the imaging unit, and a background image in which the object in the target area is not present, and extracts an area where there is a change, based on the generated differential image. The face region extraction unit extracts the face region only in the area where there is a change, extracted by the change area detection unit.

An image processor according to the next invention includes a first imaging unit that captures an image in a target area; a second imaging unit and a third imaging unit those capture an image in the target area, wherein the second imaging unit is horizontally arranged with respect to the third imaging unit at a predetermined distance; a face region extraction unit that extracts a face region, which corresponds to a face of a person, from the image captured by the first imaging unit; a stereo calculation unit that estimates a distance from the first imaging unit to each position of the image captured by the first imaging unit by a stereo method, based on two images captured by the second imaging unit and the third imaging unit; a distance distribution calculation unit that sets up a distance estimation area below the human face region by a predetermined distance and calculates distance distribution from the first imaging unit in the distance estimation area, using the distance estimated by the stereo calculation unit; and a wheelchair presence determination unit that determines whether a person having the face region is sitting on a wheelchair, by comparing the distance from the first imaging unit of the face region estimated by the stereo calculation unit with the distance distribution in the distance estimation area.

According to this aspect, the first imaging unit captures the image in the target area to be monitored, and the face region extraction unit extracts the human face region from the image captured by the first imaging unit. Further, the image in the target area is captured by the second and the third imaging units arranged with a distance therebetween horizontally. The distance from the first imaging unit is estimated by the stereo calculation unit with respect to each position of the image captured by the first imaging unit, using the stereo method, based on two images captured by the second and the third imaging units. The distance distribution calculation unit sets up the distance estimation area below the extracted human face region by a predetermined distance, and calculates distance distribution from the first imaging unit in the distance estimation area, using the distance estimated by the stereo calculation unit. The wheelchair presence determination unit then compares the distance from the first imaging unit of the face region estimated by the stereo calculation unit with the distance distribution in the distance estimation area, to determine whether a person having the face region is sitting on a wheelchair.

An image processing apparatus according to the next invention, in the image processing according to the above aspect, includes a change area detection unit that generates a differential image of an image captured by the imaging unit, and a background image which is an image of the target area when there is no one present in the target area, and extracts a change area, which corresponds to an area where there is a change, from the differential image, wherein the face region extraction unit extracts a face region from the change area extracted by the change area detection unit.

According to this aspect, the change area detection unit generates a differential image from the image captured by the first imaging unit, and a background image in which the object in the target area is not present, and extracts an area where there is a change, based on the generated differential image. The face region extraction unit extracts the face region only in the area where there is a change, extracted by the change area detection unit.

An image processor according to the next invention includes a first imaging unit that captures an image in a target area; a second imaging unit that captures an image in the target area, wherein the second imaging unit is horizontally arranged with respect to the first imaging unit at a predetermined distance; a face region extraction unit that extracts a face region, which corresponds to a face of a person, from the image captured by the first imaging unit; a stereo calculation unit that estimates a distance from the first imaging unit to each position of the image captured by the first imaging unit by a stereo method, based on two images captured by the first imaging unit and the second imaging unit; a distance distribution calculation unit that sets up a distance estimation area below the human face region by a predetermined distance and calculates distance distribution from the first imaging unit in the distance estimation area, using the distance estimated by the stereo calculation unit; and a wheelchair presence determination unit that determines whether a person having the face region is sitting on a wheelchair, by comparing the distance from the first imaging unit of the face region estimated by the stereo calculation unit with the distance distribution in the distance estimation area.

According to this aspect, the image in the target area to be monitored is captured by the first imaging unit, and the image in the target area is captured by the second imaging unit horizontally spaced away from the first imaging unit. The face region extraction unit extracts the human face region from the image captured by the first imaging unit. Further, the stereo calculation unit estimates a distance from the first imaging unit to each position of the image captured by the first imaging unit using the stereo method, based on two images captured by the first and the second imaging units. The distance distribution calculation unit sets up the distance estimation area below the extracted human face region by a predetermined distance, and calculates distance distribution from the first imaging unit in the distance estimation area, using the distance estimated by the stereo calculation unit. The wheelchair presence determination unit then compares the distance from the first imaging unit of the face region estimated by the stereo calculation unit with the distance distribution in the distance estimation area, to determine whether a person having the face region is sitting on a wheelchair.

An image processing apparatus according to the next invention, in the image processing according to the above aspect, includes a change area detection unit that generates a differential image of an image captured by the imaging unit, and a background image which is an image of the target area when there is no one present in the target area, and extracts a change area, which corresponds to an area where there is a change, from the differential image, wherein the face region extraction unit extracts a face region from the change area extracted by the change area detection unit.

According to this aspect, the change area detection unit generates a differential image from the image captured by the first imaging unit, and a background image in which the object in the target area is not present, and extracts an area where there is a change, based on the generated differential image. The face region extraction unit extracts the face region only in the area where there is a change, extracted by the change area detection unit.

BRIEF DESCRIPTION OF THE DRAWINGS

FIG. 2 is a schematic to explain a method for determining a height of a person in a target area, FIG. 3A is a schematic of a standing passenger, and FIG. 3B being a front elevation illustrating a distance estimation area set with respect to the passenger illustrated in FIG. 3A;

FIG. 4A is a schematic of a passenger sitting on a wheelchair, and FIG. 4B being a front elevation illustrating the distance estimation area set with respect to the passenger illustrated in FIG. 4A;

FIG. 6A is a distribution diagram of sections when the passenger is standing, created by designating the position of each section in the horizontal direction in the distance estimation area and the horizontal distance of each section from an imaging section, as a parameter, with respect to all sections constituting the distance estimation area, and FIG. 6B is a diagram plotting the horizontal distance of a representative point in a face region of the passenger from the imaging section in the distribution diagram of FIG. 6A;

FIG. 7A is a distribution diagram of sections when the passenger is sitting on a wheelchair, created by designating the position of each section in the horizontal direction in the distance estimation area and the horizontal distance of each section from the imaging section, as a parameter, with respect to all sections constituting the distance estimation area, and FIG. 7B is a plot of the horizontal distance of the representative point in the face region of the passenger from the imaging section in the distribution diagram of FIG. 7A;

BEST MODE FOR CARRYING OUT THE INVENTION

Exemplary embodiments of an image processor according to the present invention are explained in detail below with reference to the accompanying drawings.

First Embodiment

Figure 1:
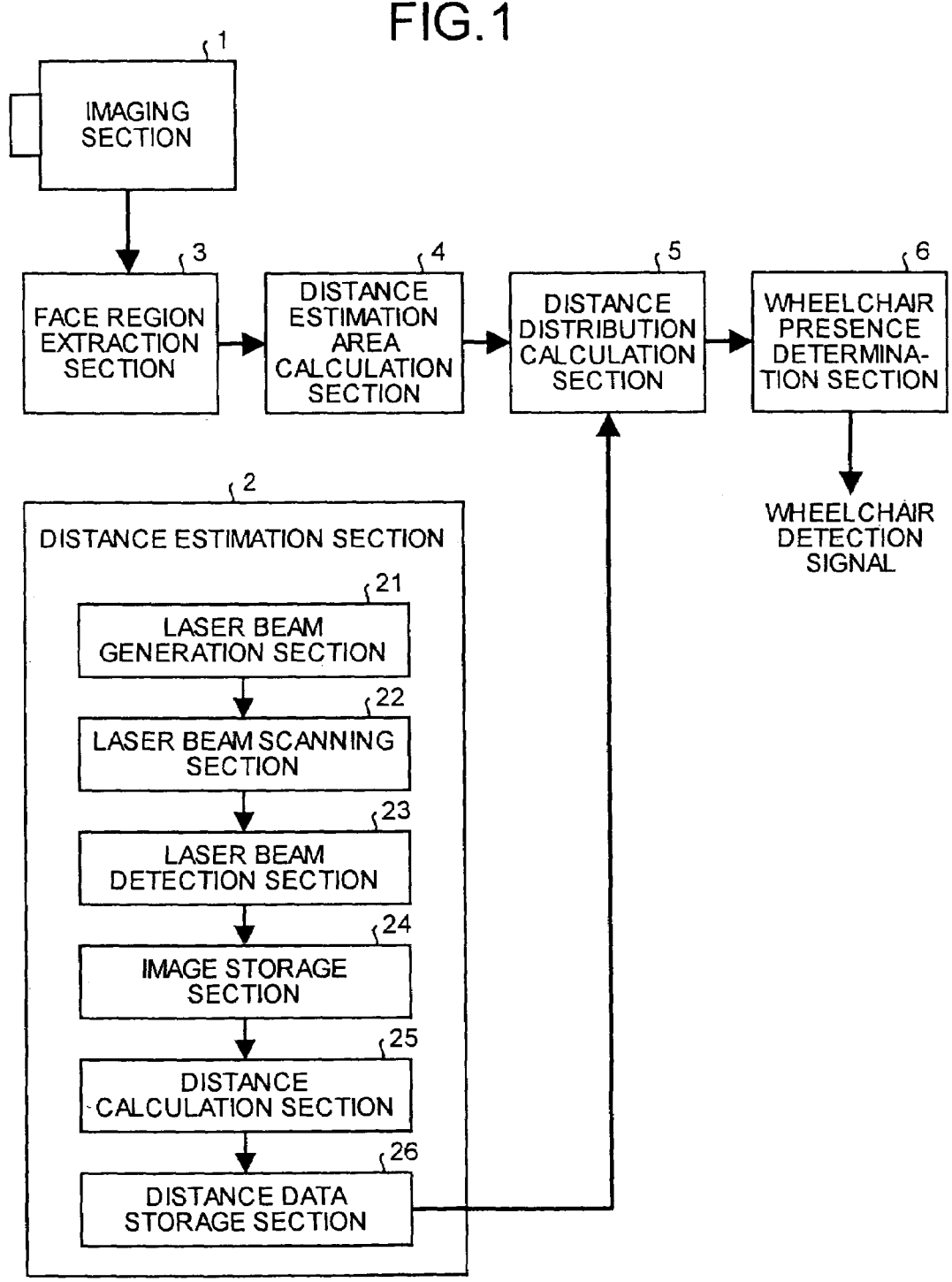
FIG. 1 is a block diagram of an image processor according to a first embodiment of the present invention.

FIG. 1 is a block diagram of an image processor according to a first embodiment of the present invention. The image processor includes an imaging section 1 that captures the image inside of a monitored area, a distance estimation section 2 that estimates a distance at each position in the field of vision, a face region extraction section 3 that extracts a face region from an image captured by the imaging section 1, a distance estimation area calculation section 4 that sets up the distance estimation area for determining the distance from the image, a distance distribution calculation section 5 that calculates the distance distribution in the distance estimation area, and a wheelchair presence determination section 6 that determines whether a passenger is sitting on a wheelchair from the distance distribution. A distance distribution calculation unit in the scope of claims corresponds to the distance estimation area calculation section 4 and the distance distribution calculation section 5.

The imaging section 1 includes a device realized by a charge coupled device (CCD) camera and the like, and is installed so as to capture the image of a human face, being an object to be imaged, in the elevator cage or in the vicinity of the ceiling in the elevator hall, to capture the image of a target area to be monitored. In other words, in the present invention, the imaging section 1 is installed such as to capture the image of the target area from the upper side or from the side, not as to capture the image vertically downward of the target area. The imaging section 1 is connected to the face region extraction section 3, and outputs the captured image data to the face region extraction section 3.

The distance estimation section 2 includes a device realized by a scanning type laser range finder or the like, which irradiates pulsed laser beams to the target area, while scanning, and estimates the distance to an object existing in the target area, by the reflection of the laser beams from the object. The distance estimation section 2 includes a laser beam generation section 21, a laser beam scanning section 22, a laser beam detection section 23, an image storage section 24, a distance calculation section 25, and a distance data storage section 26.

The laser beam generation section 21 includes a device realized by a semiconductor laser or the like that emits the pulsed laser beams and is fitted substantially at the same position as the imaging section 1. The laser beam generation section 21 has a light emission pattern in order to associate the emitted laser beam with a point of the reflected laser beam imaged by the laser beam detection section 23, by changing the way of turning on and off the laser beams, so that the laser beam generation section 21 controls On and Off of the pulsed laser beams according to the light emission pattern. The laser beam scanning section 22 controls the scanning speed and the scanning range of the pulsed laser beams so as to scan the emitted pulsed laser beams according to the light emission pattern from the laser beam generation section 21, synchronously with the image capturing timing by the laser beam detection section 23.

The laser beam detection section 23 includes a device realized by a CCD camera or the like, and images the state that the pulsed laser beams irradiated from the laser beam generation section 21 are reflected by the object, as a laser beam-reflected image, synchronously with scanning of the laser beam scanning section 22. The image storage section 24 stores the laser beam-reflected image captured by the laser beam detection section 23 together with the time information.

The distance calculation section 25 reads out the laser beam-reflected image stored in the image storage section 24, and calculates the distance from the laser beam generation section 21 to the laser beam-reflecting position by image processing. At the time of calculation, since the time when the image is captured and the scanning angle (and the light emission pattern) of the laser beam generation section 21 at that time are associated with each other, the three-dimensional position on the object where the pulsed laser beam is irradiated, that is, the distance from the laser beam generation section 21 (the imaging section 1), is estimated from the scanning angle and the distance between the laser beam generation section 21 and the laser beam detection section 23, based on the principle of the trigonometrical survey. The distance data storage section 26 stores the calculated distance data.

The face region extraction section 3 extracts a human face region from the input image by the imaging section 1 according to an algorithm for extracting the human face region, and calculates the position of the extracted face region, for example, the barycentric position in the face region. The face region is stored together with the position of the face region. For the human face region extraction algorithm, well-known methods are used, for example, a method of extracting the face region based on the extraction of a flesh-colored portion in a color image, a method in which a face image of a particular person is prepared as a template, and a portion where the captured image is best superposed on the template is extracted as the face region (template matching), and a method of extracting the face region by detecting face pieces such as the eyes, the nose, the mouth, and the ears from the captured image. When a plurality of persons is present in the image, a plurality of face regions are extracted and stored together with the positions of the calculated face regions, respectively.

The distance estimation area calculation section 4 sets up the distance estimation area based on the position of the extracted face region. The distance estimation area is a partial area in the target area set for performing the determination relating to whether the passenger in the elevator is standing or sitting on a wheelchair. In the present invention, the distance estimation area is set based on the position of the human face, as a region in the vicinity of the knee (the region under the knee) of the wheelchair user.

FIG. 2 is a schematic to explain a method of setting the distance estimation area by the distance estimation area calculation section 4. Basically, the distance estimation area is set, from the statistical data indicating that the position of the passenger's wheelchair (the position of the knees at the time of sitting on a wheelchair) exists below the face of a passenger 100 by a predetermined distance. Specifically, at the time of calculating the distance estimation area, the distance estimation area calculation section 4 holds the basic data relating to the width of the human average face, and compares the width of a face region 111 extracted by the face region extraction section 3 with the basic data, thereby to calculate a distance L from the imaging section 1 to the person having the face region 111. The installation angle of depression of the imaging section 1, that is, an angle θ between the optical axis of the lens in the imaging section 1 and the horizontal line, and the installation height H of the imaging section 1 from the floor can be measured at the time of installing the imaging section 1. Therefore, a schematic height h of the passenger 100 from the floor is calculated as below, using the distance L, the installation angle of depression θ, and the installation height H.

$$h = H - 1 \cdot \sin \theta$$

The distance estimation area 112 is set as the position of the wheelchair in the image (the position of the knees at the time of sitting on a wheelchair), in a portion located below the face of the passenger 100, being an object, by a predetermined distance s. The distance estimation area 112 has a predetermined range so that the region below the knees can be extracted, even if the passenger 100 is a different size.

The distance distribution calculation section 5 extracts only the distance data in the distance estimation area set by the distance estimation area calculation section 4, from the distance data estimated by the distance estimation section 2, to calculate the distance distribution in the distance estimation area. The distance distribution calculation section 5 then outputs the distance distribution result to the wheelchair presence determination section 6. Since the distance distribution calculation section 5 calculates the distance distribution only for the distance data in the set distance estimation area, the time for calculating the distance distribution in other areas can be saved.

The wheelchair presence determination section 6 determines whether the target person is sitting on a wheelchair, based on the distance from the imaging section 1 in the barycentric position of the face region, and the distance distribution input by the distance distribution calculation section 5, and outputs the determination result to the external device.

Figure 3A:
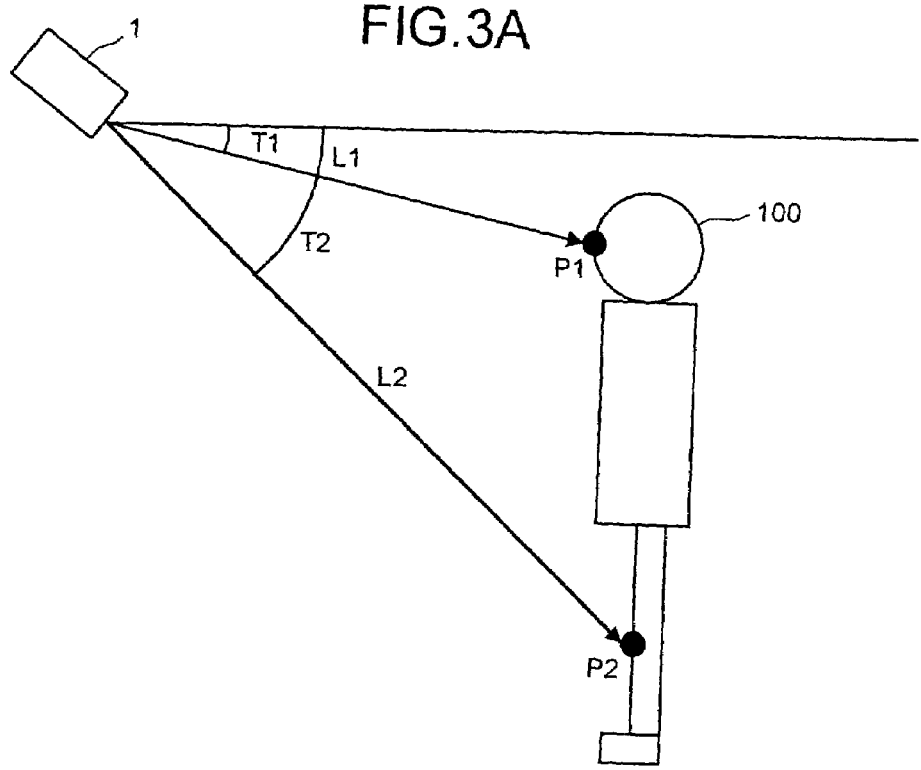
FIGS. 3A and 3B are schematics to explain a method for determining whether the person in the target area is sitting on a wheelchair.
Figure 3B:
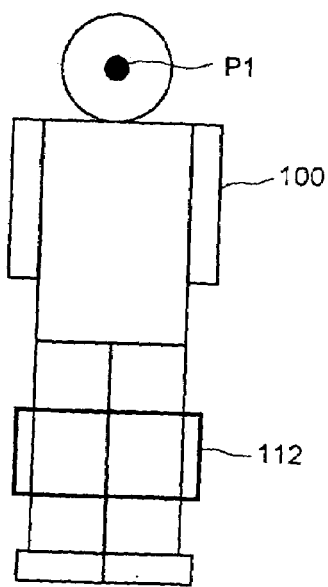
Figure 4A:
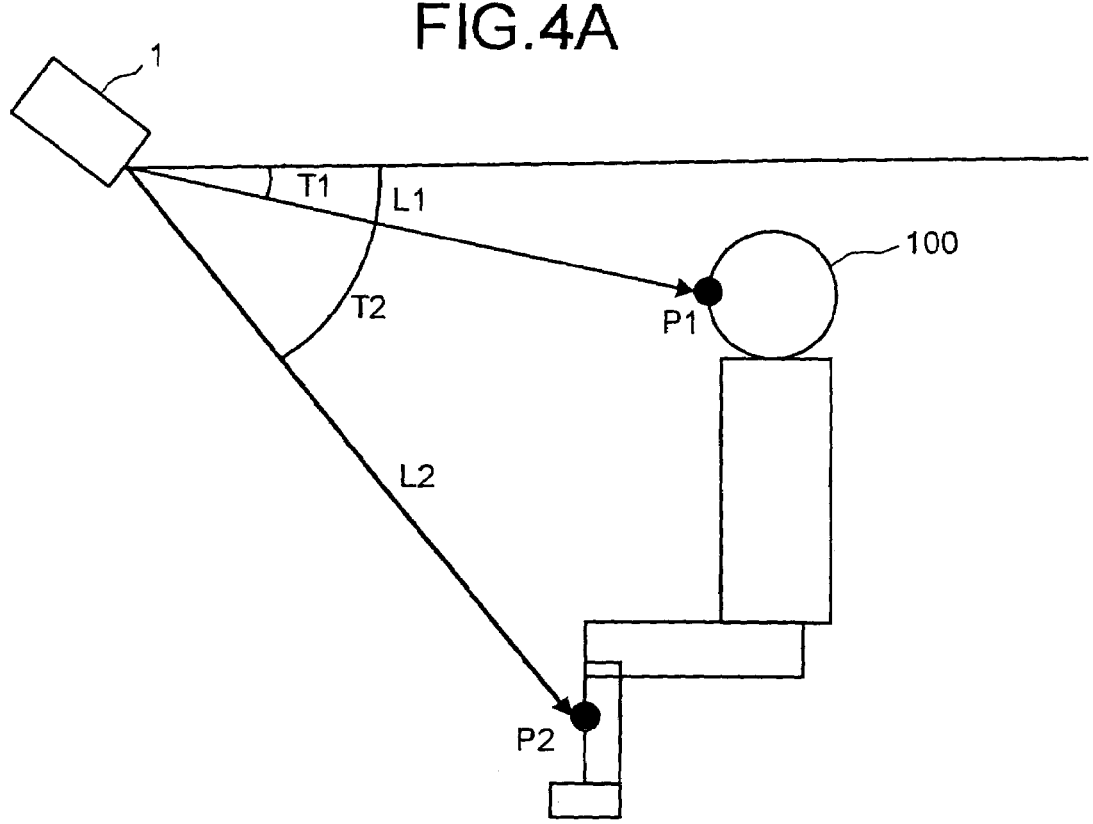
FIGS. 4A and 4B are schematics to explain a method for determining whether the person in the target area is sitting on a wheelchair.
Figure 4B:
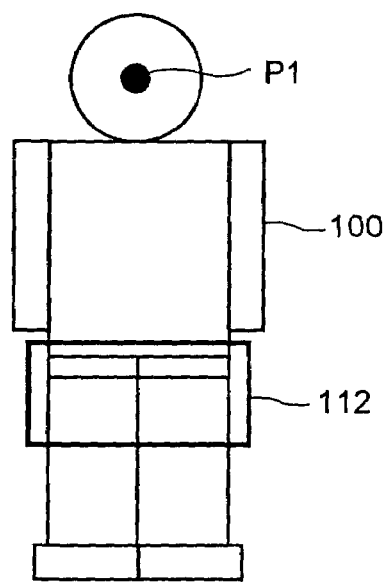
Figure 5:
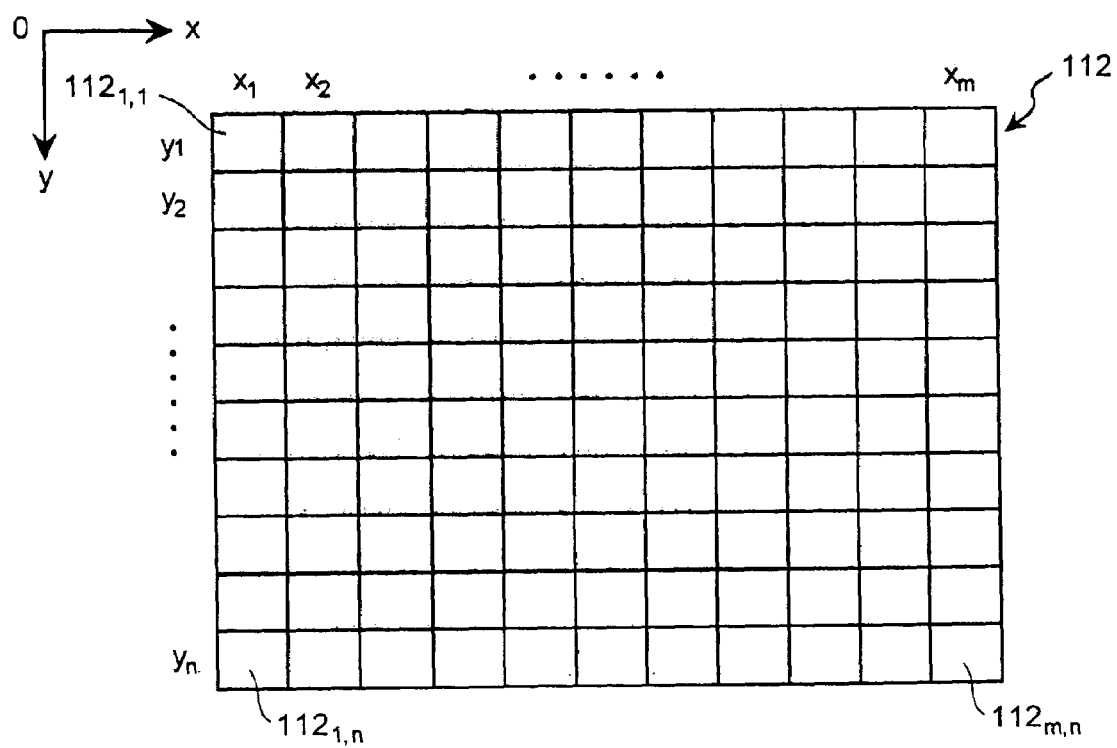
FIG. 5 is a schematic diagram for explaining a method of distance estimation in the distance estimation area.

The method of determining whether the target person (passenger) is standing or sitting on a wheelchair, will be explained with references of FIGS. 3A to 7B. FIG. 3A is a schematic of a standing passenger, and FIG. 3B is a front elevation illustrating the distance estimation area set with respect to the passenger illustrated in FIG. 3A. FIG. 4A is a schematic of a passenger sitting on a wheelchair, and FIG. 4B is a front elevation illustrating the distance estimation area set with respect to the passenger illustrated in FIG. 4A. FIG. 5 is a schematic diagram for explaining the method of the distance estimation in the distance estimation area. FIG.

6A is a distribution diagram of sections when the passenger is standing, created by designating a position of each section in the horizontal direction in the distance estimation area and a horizontal distance of each section from an imaging section, as a parameter, with respect to all sections constituting the distance estimation area, and FIG. 6B is a diagram plotting the horizontal distance of a representative point in a face region of the passenger from the imaging section in the distribution diagram of FIG. 6A. FIG. 7A is a distribution diagram of sections when the passenger is sitting on a wheelchair, created by designating the position of each section in the horizontal direction in the distance estimation area and the horizontal distance of each section from the imaging section, as a parameter, with respect to all sections constituting the distance estimation area, and FIG. 7B is a plot of the horizontal distance of the representative point in the face region of the passenger from the imaging section in the distribution diagram of FIG. 7A.

In these figures, P1 indicates a representative point in the face region, for example, a barycentric position (two-dimensional barycentric position of the face region, as seen from the front), P2 indicates a position in the distance estimation area 112 set at a position below the representative point P1 in the face region, by a predetermined distance, T1 and T2 respectively indicate the angle between the horizontal line and a distance estimation line drawn from the center of the lens in the imaging section 1 to the positions P1 and P2, and L1 and L2 respectively indicate a distance from the center of the lens in the imaging section to the positions P1 and P2.

For the brevity of explanation, it is assumed below that no other objects having movement other than the target passenger 100 exist in the distance estimation area 112 set in FIGS. 3B and 4B, and the background is far away as compared with the horizontal distance of the passenger from the imaging section.

When the passenger 100 is in the target area of the imaging section 1, as illustrated in FIGS. 3A and 4A, the distance distribution calculation section 5 calculates a horizontal distance L2·cos (T2) of the position P2 in the distance estimation area 112 set as illustrated in FIGS. 3B or 4B, from the imaging section 1.

When the distance distribution calculation section 5 calculates the distance for each position P2 in the distance estimation area 112, the distance estimation area 112 illustrated in FIG. 5 is used. The upper right edge in the distance estimation area 112 is designated as a starting point, the x-axis is plotted in the horizontally rightward direction from the stating point, and y-axis is plotted downward perpendicular to the x-axis through the starting point. If respective columns obtained by equally dividing the x-axis into m (m is a natural number) are designated as $x_1, x_2, \ldots, x_m$ in the order of closest to the starting point, and respective rows obtained by equally dividing the y-axis into n (n is a natural number) are designated as $y_1, y_2, \ldots, y_m$ in the order of closest to the starting point, m×n sections are obtained in the distance estimation area 112. The section created in the portion where the column $x_i$ and the row $y_j$ intersect with each other is designated as $112_{ij}$ (i and j are both natural numbers, and i≦m, and j≦n).

The distance distribution calculation section 5 calculates the horizontal distance L2·cos (T2) from the imaging section 1 to the respective sections $112_{1,1}$ to $112_{1,m}$ in the row $y_1$, from the distance L2 from the imaging section 1 obtained for sections $112_{1,1}$ to $112_{1,m}$ existing in the row $y_1$ and the relation illustrated in FIG. 3A. As a result, combinations of the position on the x-axis in the distance estimation area 112 in the row $y_1$ and the horizontal distance from the imaging section 1 are obtained. Likewise, combinations of the position on the x-axis in the distance estimation area 112 and the horizontal distance from the imaging section 1 are obtained for respective sections existing in the respective rows $y_2$ to $y_n$.

As illustrated in FIGS. 6A and 7A, a distribution diagram for all sections in the distance estimation area 112 are created, by designating the position on the x-axis in the distance estimation area 112 and the horizontal distance from the imaging section 1 as parameters. In FIGS. 6A and 7B, the x-axis stands for "the position on the x-axis in the distance estimation area", and is the same axis as the x-axis in the distance estimation area 112 illustrated in FIG. 5. The y-axis stands for "the horizontal distance from the imaging section", and is the horizontal distance from the imaging section 1 obtained for each section. The z-axis stands for "the number of sections at the same position", and indicates how many sections are overlapped in the position on the xy plane indicated by the combination (of the position on the x-axis in the distance estimation area and the horizontal distance from the imaging section).

When the passenger 100 is in standing state, the distribution diagram as illustrated in FIG. 6A is obtained, wherein the distribution graph, in which the horizontal distance from the imaging section 1 is plotted at R1, expresses the portion in the vicinity of the legs (knees) of the passenger 100 existing in the distance estimation area 112 in FIG. 3B. The distribution graph, in which the horizontal distance from the imaging section 1 is plotted at R3, expresses the background where the legs of the passenger 100 in the distance estimation area 112 in FIG. 3B do not exist.

As illustrated in FIG. 3A, when the passenger 100 is standing, the horizontal distance L1·cos (T1) from the imaging section 1 of the position P1 in the face region and the horizontal distance L2·cos (T2) from the imaging section 1 of the leg position P2 in the distance estimation area are equal, and the horizontal distance from the imaging section 1 of the barycentric position P1 in the face region becomes equal to R1, as illustrated in FIG. 6B. In other words, the barycentric position P1 and the position of the legs in the distance estimation area 112 are located linearly in the vertical direction.

On the other hand, when the passenger 100 is sitting on a wheelchair, a distribution diagram as illustrated in FIG. 7(a) is obtained, wherein the distribution graph, in which the horizontal distance from the imaging section 1 is plotted at R1, expresses the portion in the vicinity of the legs (knees) of the passenger 100 existing in the distance estimation area 112 illustrated in FIG. 4(b). The distribution graph, in which the horizontal distance from the imaging section 1 is plotted at R2, expresses the portion in the vicinity of the abdominal region included in the upper part of the distance estimation area 112. The distribution graph, in which the horizontal distance from the imaging section 1 is plotted at R3, expresses the background where the legs of the passenger 100 in the distance estimation area 112 do not exist.

As illustrated in FIG. 4A, when the passenger 100 is sitting on a wheelchair, the horizontal distance L1·cos (T1) from the imaging section 1 of the barycentric position P1 in the face region is longer than the horizontal distance L2·cos (T2) from the imaging section 1 of the leg position P2 in the distance estimation area 112. When the horizontal distance from the imaging section 1 of the barycentric position P1 in the face region is plotted in FIG. 7A, as illustrated in FIG. 7B, the position becomes equal to the horizontal distance R2 from the imaging section 1. In other words, the barycentric position P1 in the face region (the horizontal distance from the imaging section=R2) and the distribution position of the leg (knee) portion in the distance estimation area 112 (the horizontal distance from the imaging section=R1) are not located on the vertical line.

Therefore, the wheelchair presence determination section 6 compares the barycentric position P1 in the face region estimated by the distance estimation section 2 with the distance distribution in the distance estimation area 112 calculated by the distance distribution calculation section 5. When these are located linearly in the vertical direction, the wheelchair presence determination section 6 determines that the target passenger 100 is standing, and when these are not located linearly in the vertical direction, the wheelchair presence determination section 6 determines that the target passenger 100 is sitting on a wheelchair. The result is output to an external device, such as an elevator controller.

In the above explanation, an example in which the wheelchair presence determination section 6 determines whether the passenger 100 is standing or sitting on a wheelchair by comparing the barycentric position P1 in the face region with the distance distribution in the distance estimation area 112, has been explained. However, the horizontal distance from the imaging section 1 of the whole face region, instead of the barycentric position P1, may be compared as a representative point of the face region, with the distance distribution in the distance estimation area 112. For example, in this case, it can be determined whether the passenger 100 is standing or sitting on a wheelchair, by dividing the whole face region into a plurality of sections, creating the distribution diagram of the sections with respect to the divided all sections, by designating the horizontal position in the face region in each section and the horizontal distance from the imaging section 1 of each section, as parameters, and applying these to FIGS. 6(a) and 7(a) for comparison.

An operation of the image processor shown in FIG. 1 will be explained with reference to a flowchart in FIG. 8. The imaging section 1 captures the image of the target area such as inside of the elevator cage or the elevator hall, and the captured image is input to the face region extraction section 3 (step S1). The face region extraction section 3 extracts the face region of the target person from the input image, and calculates the barycentric position (step S2). The distance estimation area calculation section 4 determines the distance from the imaging section 1 of the target person from the extracted face region, and sets up the distance estimation area below the barycentric position in the face region by a predetermined distance (step S3).

On the other hand, when the imaging section 1 performs imaging, the laser beam generation section 21 and the laser beam scanning section 22 scan the target area, while emitting the pulsed laser beams, the laser beam detection section 23 captures the image of the laser beams reflected by the object in the target area, synchronously with the laser beam scanning section 22, and the captured laser beam-reflected image is stored in the image storage section 24. The distance calculation section 25 calculates the distance from the laser beam generation section 21 (the imaging section 1) to the object, from the stored laser beam-reflected image and the scanning angle of the laser beam scanning section 22, and the calculated distance data is stored in the distance data storage section 26 (step S4).

The distance distribution calculation section 5 extracts the distance data in the distance estimation area from the distance data storage section 26, and calculates the distance distribution (step S5). The wheelchair presence determination section 6 then compares the barycentric position in the face region stored in the distance data storage section 26 with the distance distribution in the calculated distance data in the distance estimation area. When it is determined that the barycentric position in the face region and the distribution position in the distance data in the distance estimation area are located on a vertical line, the wheelchair presence determination section 6 determines that the target person is standing, and when it is determined that the barycentric position in the face region and the distribution position in the distance data in the distance estimation area are not located on the vertical line, the wheelchair presence determination section 6 determines that the target person is sitting on a wheelchair (step S6). The wheelchair presence determination section 6 then outputs the determination result to the external device (step S7), and finishes processing.

The result output by the wheelchair presence determination section 6 is used for changing the operation mode of the elevator, for example, by the elevator controller. That is to say, when the wheelchair presence determination section 6 determines that the passenger sitting on a wheelchair exists in the target area, the wheelchair operation mode is set by the elevator controller, in which for example, the speed of the elevator is set lower than usual, and at the time of stopping on the floor, the landing accuracy between the elevator and the hall floor is adjusted more precisely than usual. On the other hand, when the wheelchair presence determination section 6 determines that only standing passengers exist in the target area, the normal operation mode is set by the elevator controller, in which the speed of the elevator is not set lower, and the landing accuracy is not particularly increased.

In the first embodiment, the imaging section 1 and the laser beam detection section 23 in the distance estimation section 2 are installed respectively at different positions, but the imaging section 1 and the laser beam detection section 23 may be installed substantially at the same position. In this case, it is necessary to install the laser beam generation section 21 and the imaging section 1 at different positions.

The pulsed laser beam long in the vertical (longitudinal) direction, and deformed into a slit form by a cylindrical lens can be used as the laser beam generation section 21. In this case, the distance distribution can be measured for one line in the longitudinal direction, by one image by the laser beam detection section 23, and hence there is an advantage in that the scanning direction can be only in the horizontal direction.

According to the first embodiment, since the barycentric position in the human face region is compared with a region downward by a predetermined distance from the face region, specifically, the distance distribution in the region below the knees, from the image captured by the imaging section 1, to determine whether the imaged passenger is sitting on a wheelchair, there is the effect that the presence of a wheelchair passenger can be recognized with high probability.

Second Embodiment

Figure 9:
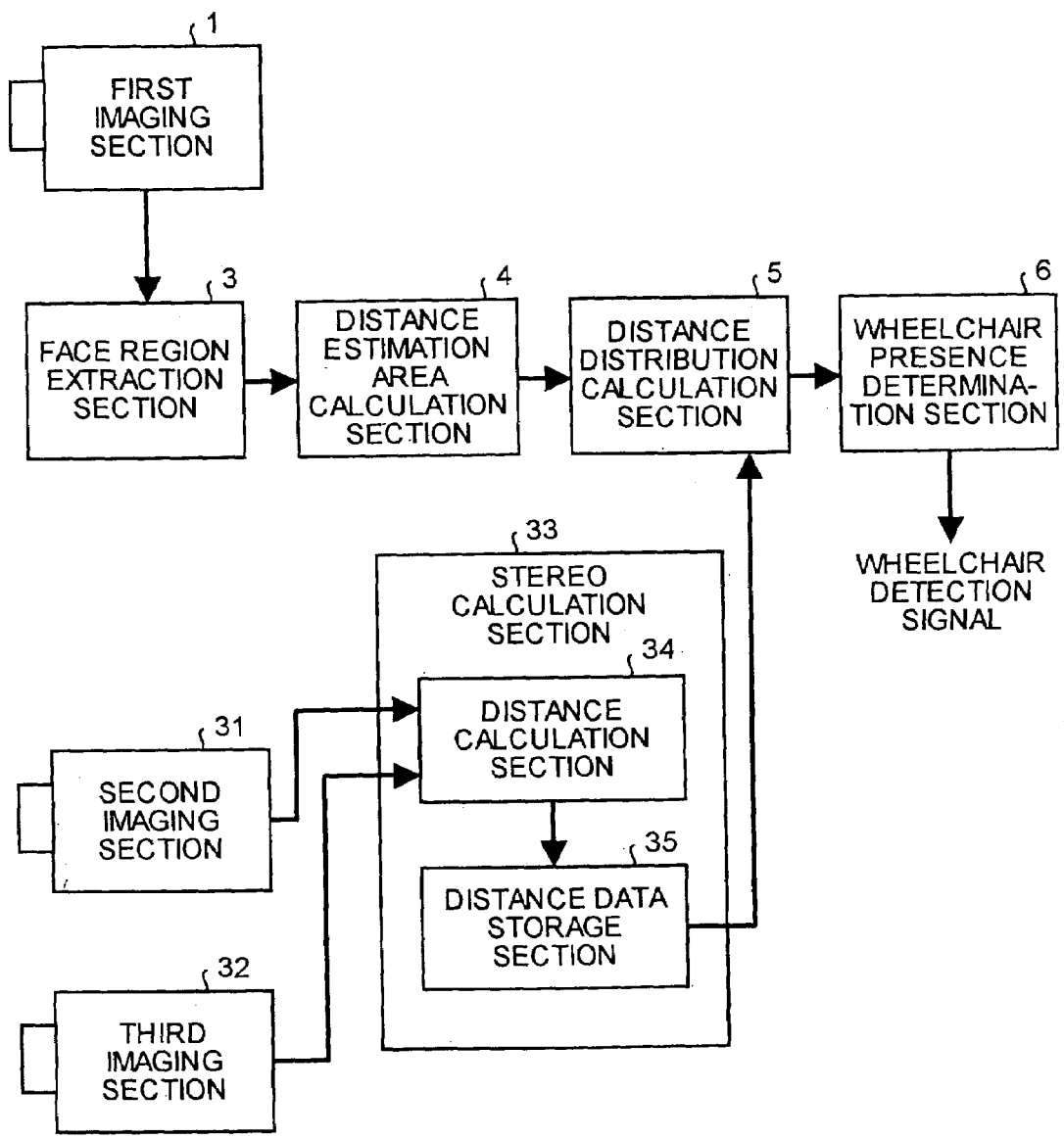
FIG. 9 is a block diagram of an image processor according to a second embodiment of the present invention.

A second embodiment of the present invention will be explained next. FIG. 9 is a block diagram of an image processor according to the second embodiment. The image processor in the second embodiment has a second imaging section 31 and a third imaging section 32 that capture an image in the target area from different positions, and a stereo calculation section 33 that calculates the distance of an object from the image captured by the second imaging section 31 and the third imaging section 32, by using a twin-lens stereo method, instead of the distance estimation section 2 in the image processor shown in FIG. 1. The other configuration is the same as that shown in FIG. 1, and like reference signs refer to like components throughout, and the explanation thereof is omitted. The first imaging section 1 in the second embodiment corresponds to the imaging section 1 in FIG. 1. The distance distribution calculation unit in the scope of claims corresponds to the distance estimation area calculation section 4 and the distance distribution calculation section 5.

The second imaging section 31 and the third imaging section 32 respectively comprise a device realized by the CCD camera or the like, and horizontally spaced away from each other. The second imaging section 31 and the third imaging section 32 are arranged substantially at the same position as the first imaging section 1 so as to be able to image the target area imaged by the first imaging section 1, and calculate the distance from the first imaging section 1 to the object existing in the target area.

The stereo calculation section 33 is for measuring the distance to the object by obtaining the correspondence between respective pixels in two images input by the second imaging section 31 and the third imaging section 32, of which geometrical position is known beforehand, to detect a parallax, and converting the parallax to a distance, and has a distance calculation section 34 and a distance data storage section 35.

Figure 10:
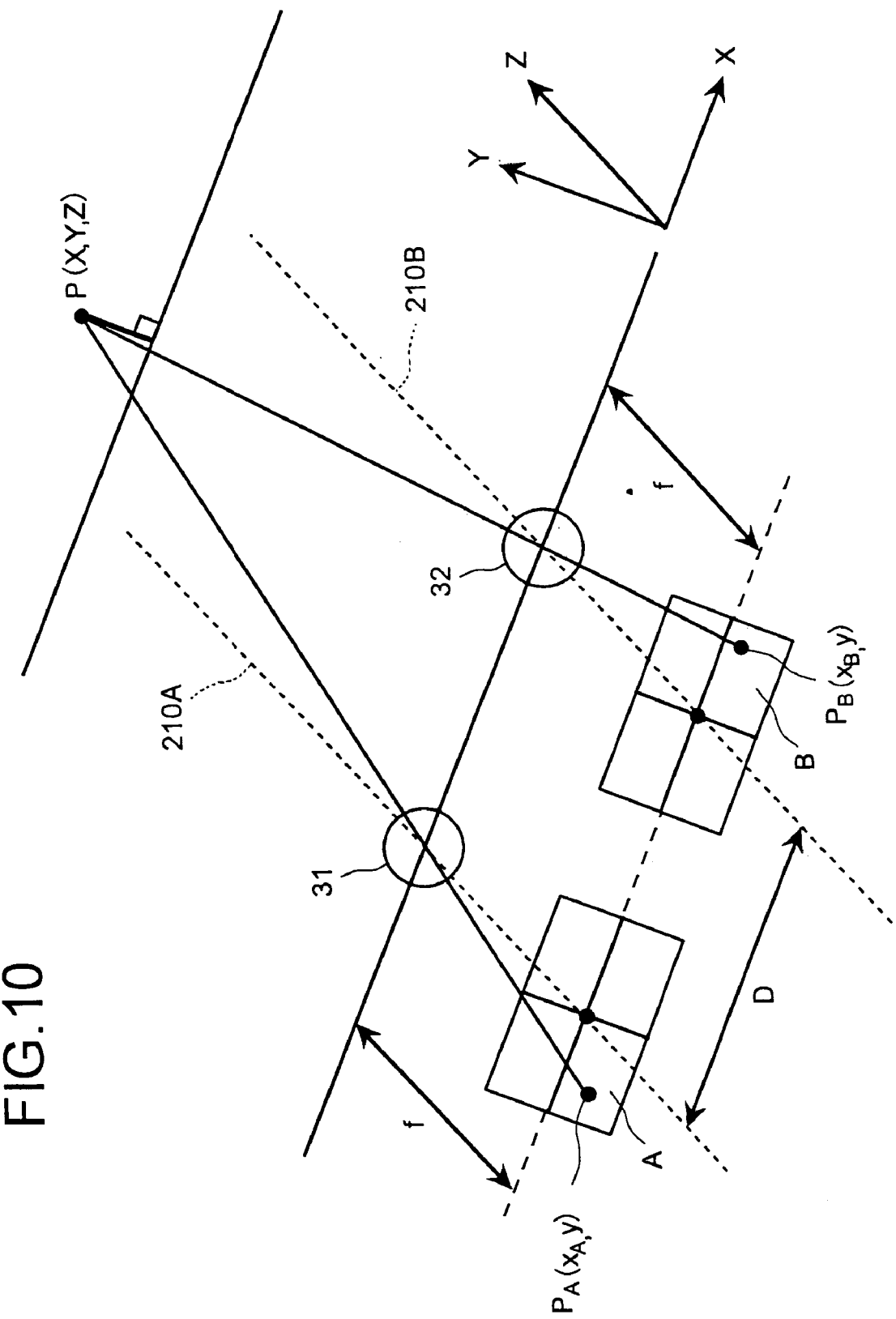
FIG. 10 is a diagram for explaining the principle of a twin-lens stereo method.

The principle of the stereo image processing using the twin-lens stereo method will be explained with reference to FIG. 10. The two imaging sections 31 and 32 realized by the CCD camera having lenses with the optical axes 201A and 201B being parallel, and having equal focal distance f are horizontally spaced away from each other with a predetermined distance D. A horizontal axis, on which the two imaging sections 31 and 32 are arranged, is designated as the X-axis, an axis orthogonal to the X-axis and extending in the height direction is designated as the Y-axis, and an axis orthogonal to the X-axis and the Y-axis is designated as the Z-axis. An image captured by the (second) imaging section 31 is designated as an image A, and an image captured by the (third) imaging section 32 is designated as an image B. Further, a corresponding point of those images A and B are obtained, and the coordinates of the corresponding point on the images A and B are respectively designated as $P_A (x_A, y)$, $P_B (x_B, y)$. The distance z from the imaging section 1 to the object P is obtained from the following equation:

$$z = f \cdot D / (x_A - x_B) = f \cdot D / S$$

Where, $x_A - x_B = S$ indicates the parallax, and the parallax S indicates a difference in the position of images captured by the imaging sections 31 and 32, when an image of one object is captured by the two imaging sections 31 and 32 spaced away from each other with the predetermined distance D, having the optical axes 201A and 201B parallel with each other. In this manner, the distance to the object on the image can be obtained from the two images A and B captured by the second imaging section 31 and the third imaging section 32.

The distance calculation section 34 in the stereo calculation section 33 calculates the distance from the first imaging section 1 to the object by the stereo image processing, from the two images A and B input by the second imaging section 31 and the third imaging section 32.

The distance data storage section 35 stores the distance data calculated by the distance calculation section 34.

Figure 11:
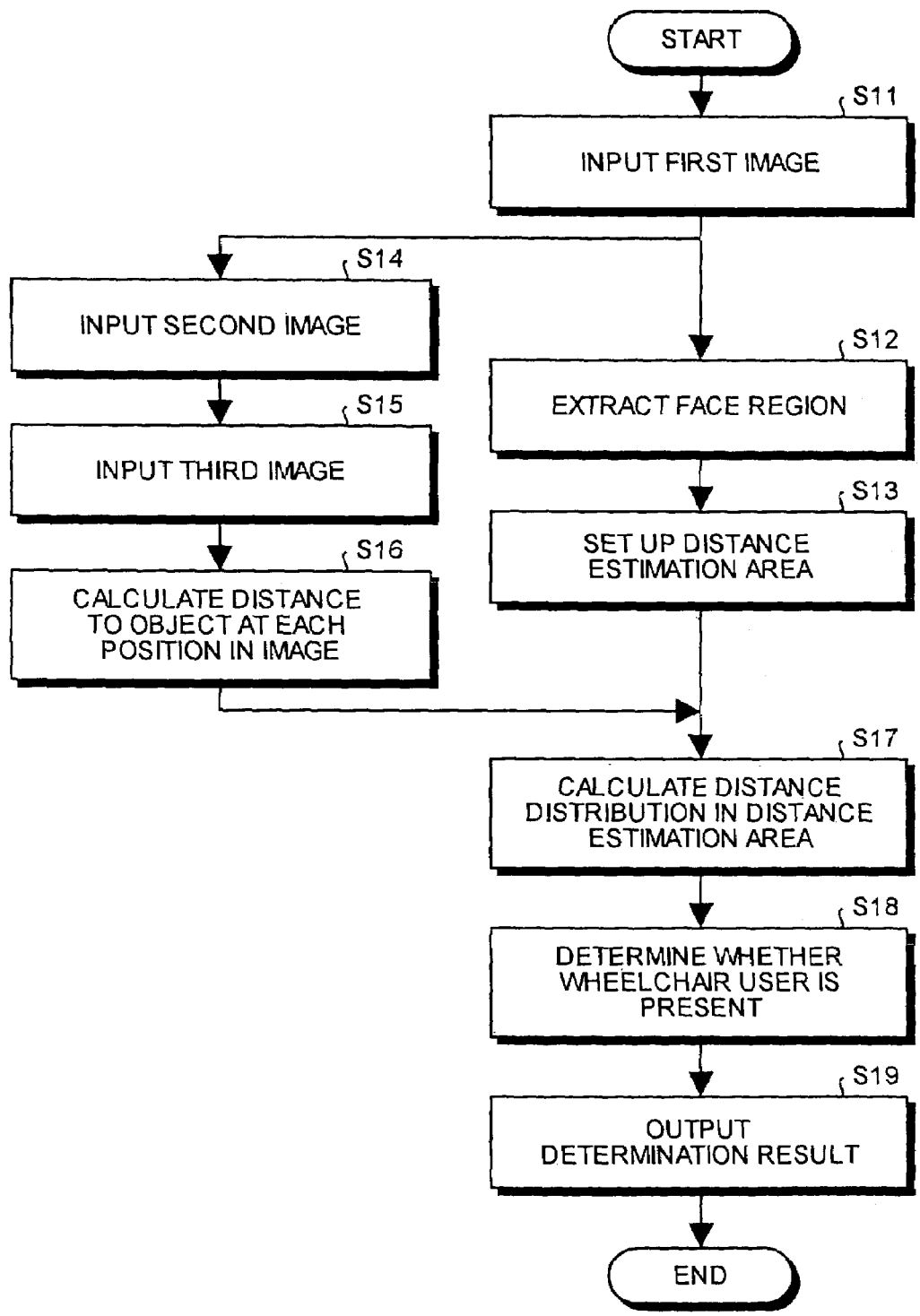
FIG. 11 is a flowchart of a processing performed by the image processor illustrated in FIG. 9.

An operation of the image processor shown in FIG. 9 will be explained with reference to the flowchart illustrated in FIG. 11. The same processing as at steps S1 to S3 explained in the first embodiment with reference to FIG. 8 is performed, to set the distance estimation area on the image (steps S11 to S13). That is to say, the barycentric position in the human face region, and the distance of the target person from the first imaging section 1 are calculated from the image of the target area captured by the first imaging section 1, and the distance estimation area is set below the barycentric position in the face region by a predetermined distance.

On the other hand, different from the process at steps S11 to S13, when the first imaging section 1 captures the image of the target area, the second imaging section 31 captures the image of the target area, and the stereo calculation section 33 stores the captured images (step S14). Subsequently, the third imaging section 32 captures the image of the target area, and the stereo calculation section 33 stores the captured image (step S15). At steps S14 to 15, the imaging of the target area by the second imaging section 31 and the third imaging section 32 may be performed at the same time or with predetermined time shifted.

The distance calculation section 34 in the stereo calculation section 33 calculates the distance from the first imaging section 1 for each position in the image by the stereo image processing from the stored two images, and stores the calculated distance data in the distance data storage section 35 (step S16).

Figure 8:
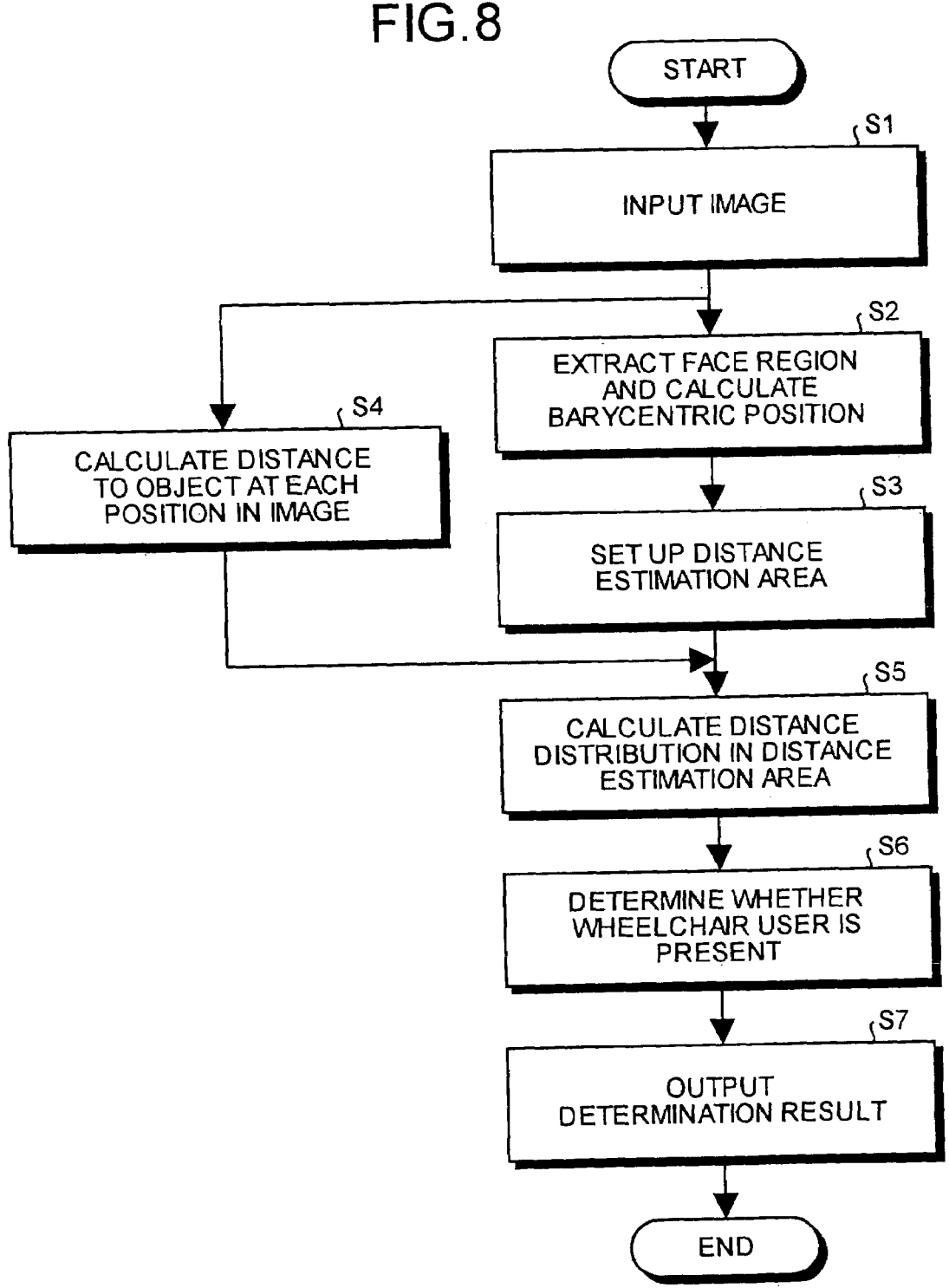
FIG. 8 is a flowchart of a processing performed by the image processor illustrated in FIG. 1.

Subsequently, the same processing as at steps S5 to S7 explained in the first embodiment referring to FIG. 8 is performed, to determine whether the person having the extracted face region is sitting on a wheelchair (steps S17 to S19). In other words, the distance distribution in the distance data in the distance estimation area below the barycentric position of the face region in the image captured by the first imaging section 1 by a predetermined distance is calculated, and the barycentric position in the face region is compared with the calculated distance distribution in the distance data in the distance estimation area. As a result of comparison, when the barycentric position in the face region and the distance distribution in the distance data in the distance estimation area are present on the vertical line, the distance calculation section 34 determines that the person having the face region is a standing passenger, and when the barycentric position in the face region and the distance distribution in the distance data in. the distance estimation area are not present on the vertical line, the distance calculation section 34 determines that the person having the face region is sitting on a wheelchair, and the distance calculation section 34 outputs the determination result to the external device and finishes the process.

The result output by the wheelchair presence determination section 6 is used for changing the operation mode of the elevator, for example, by the elevator controller, as in the first embodiment.

In the second embodiment, an example has been explained, in which three imaging sections, that is, the first imaging section 1 that extracts the face region, and the second imaging section 31 and the third imaging section 32 that perform the stereo image processing are installed, however, the first imaging section 1 and the second imaging section 32 may be shared, to perform the same processing with two imaging sections. In other words, the configuration may be such that the first imaging section 1 captures the image of the target area to obtain an image for extracting the face region, as well as obtaining an image for performing the stereo image processing, and the third imaging section 32 obtains another image for performing the stereo image processing. This means that, in the second embodiment, the two images required for performing the stereo image processing may not be imaged always at the same time by the second imaging section 31 and the third imaging section 32.

A case in which the barycentric position in the face region is compared with the distance distribution in the distance estimation area for determination by the wheelchair presence determination section 6 relating to whether the passenger is standing or sitting on a wheelchair is explained. However, instead of the barycentric position, the horizontal distance from the first imaging section 1 of the whole face region may be compared, as a representative point in the face region, with the distance distribution in the distance estimation area.

According to the second embodiment, since the stereo image processing is used to measure the distance from the first imaging section 1 to the object, there is the effect that the device configuration for measuring the distance can be made more compact.

Third Embodiment

Figure 12:
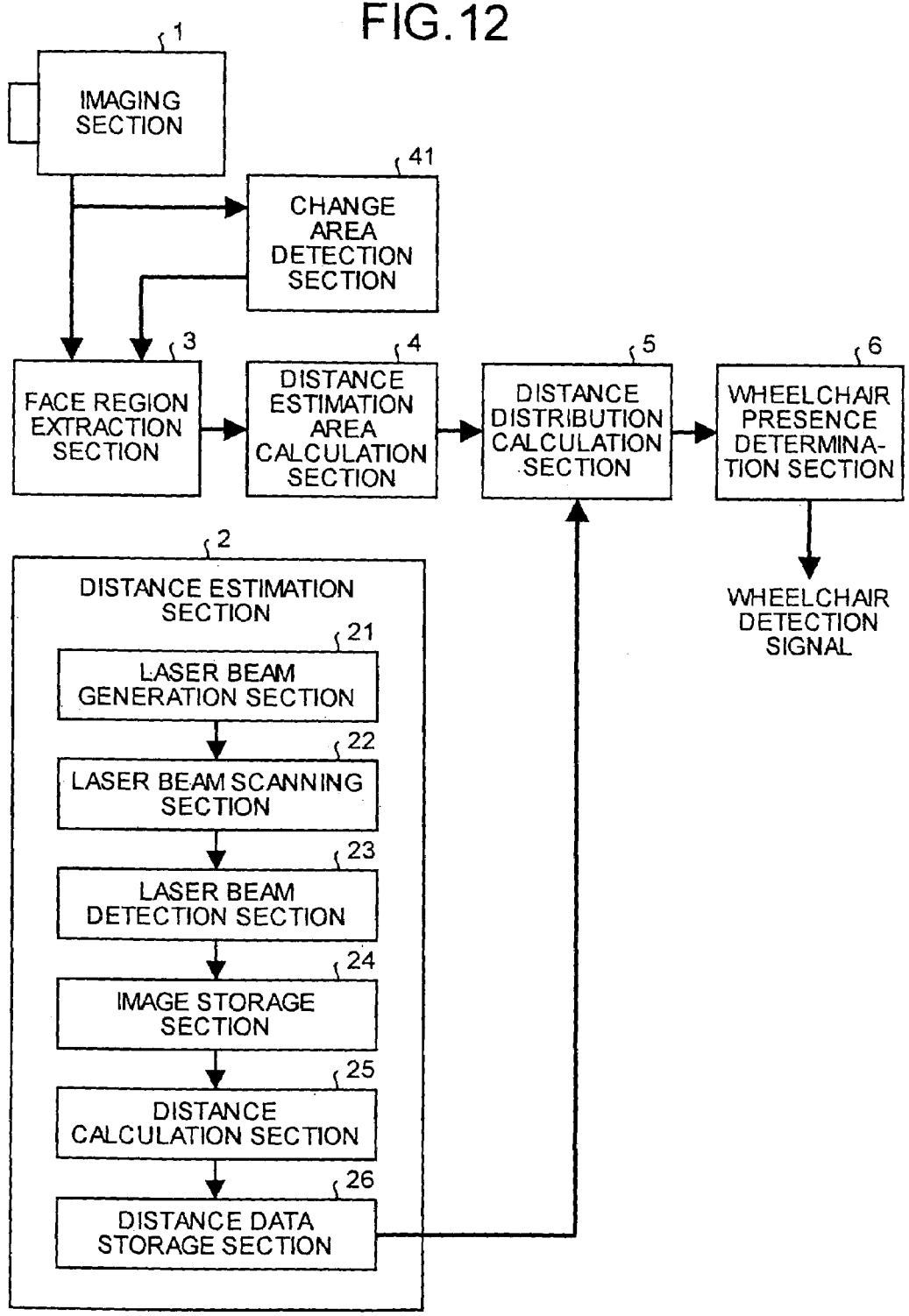
FIG. 12 is a block diagram of an image processor according to a third embodiment of the present invention.

A third embodiment of the present invention will be explained next. FIG. 12 is a block diagram of an image processor according to the third embodiment. The image processor in the third embodiment has the configuration such that a change area detection section 41 that extracts only a change area from the image captured by the imaging section 1 is provided in the image processor described in the first embodiment. The other configuration is the same as that in the first embodiment and like reference signs refer to like components throughout, and explanation thereof is omitted.

The change area detection section 41 has a background image captured in the state with no human object present in the target area to be imaged by the imaging section 1, and when the image captured by the imaging section 1 is input, the change area detection section 41 generates a differential image by performing differential operation processing to perform binarization of the absolute value of a difference between respective pixel values, in the two images, that is, the captured image and the background image, based on a predetermined threshold. A part having a change that is not present in the background image is recoded in the differential image as a candidate of the object. In the differential image, the position information of the part having a change is output to the face region extraction section 3. The distance distribution calculation unit in the scope of claims corresponds to the distance estimation area calculation section 4 and the distance distribution calculation section 5.

When having received the position information of the part having a change from the change area detection section 41, the face region extraction section 3 extracts a human face region from the image input by the imaging section 1, according to the human face region extraction algorithm, by using the position information, and calculates the position of the face region, for example, the barycentric position. The face region is stored together with the position of the face region.

Figure 13:
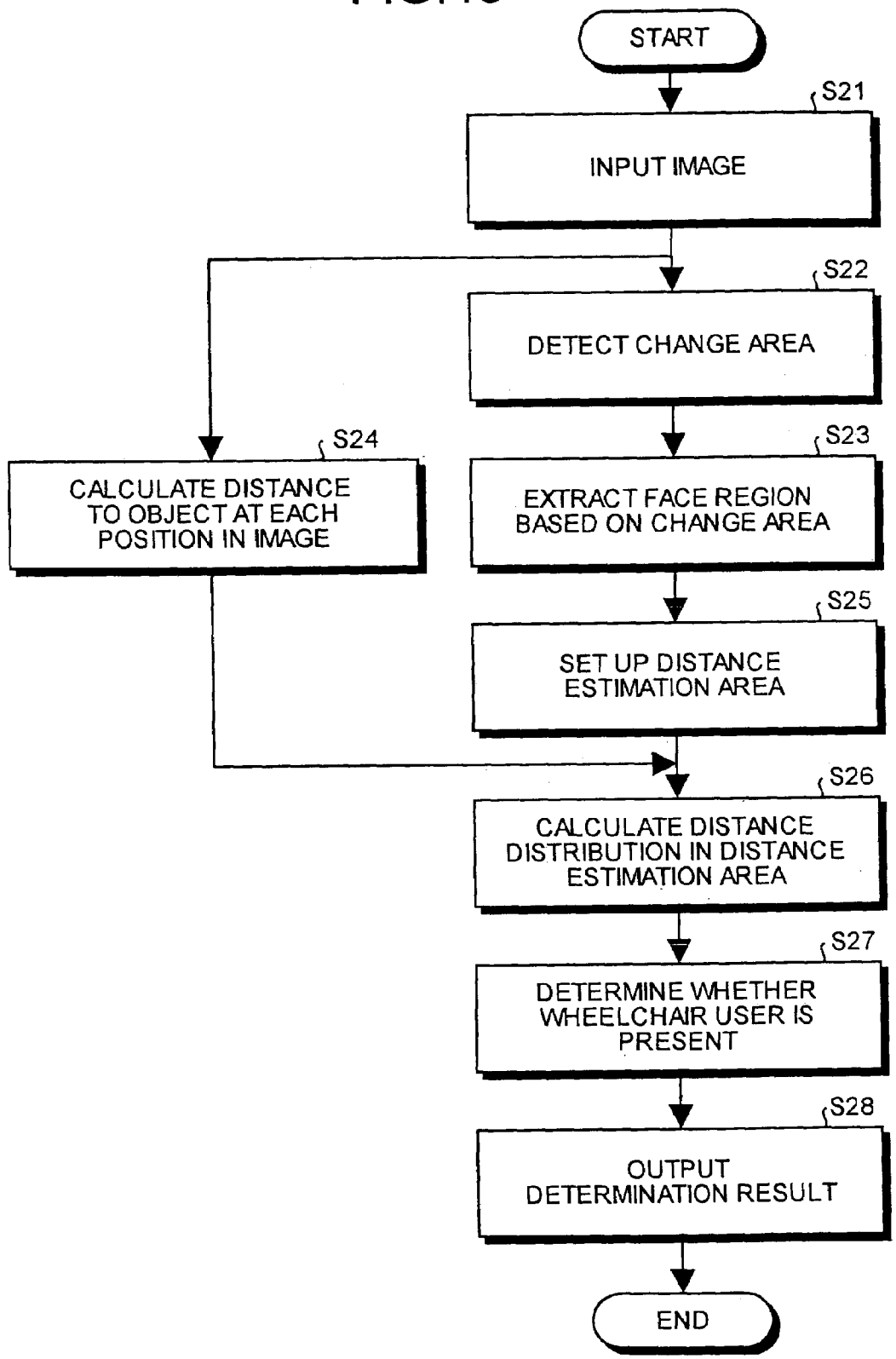
FIG. 13 is a flowchart of a processing performed by the image processor illustrated in FIG. 12.
Figure 14:
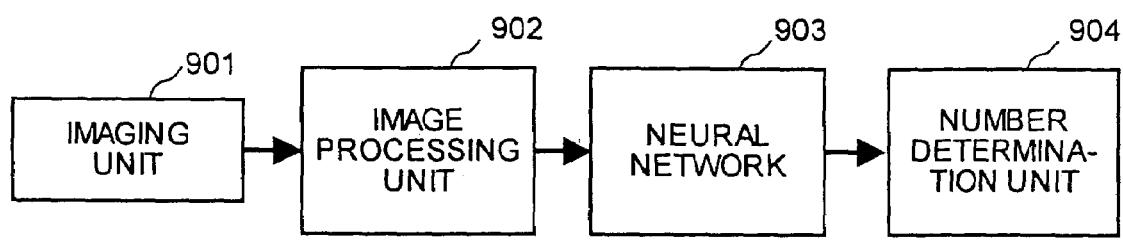
FIG. 14 is a block diagram of a conventional image processor.
Figure 15:
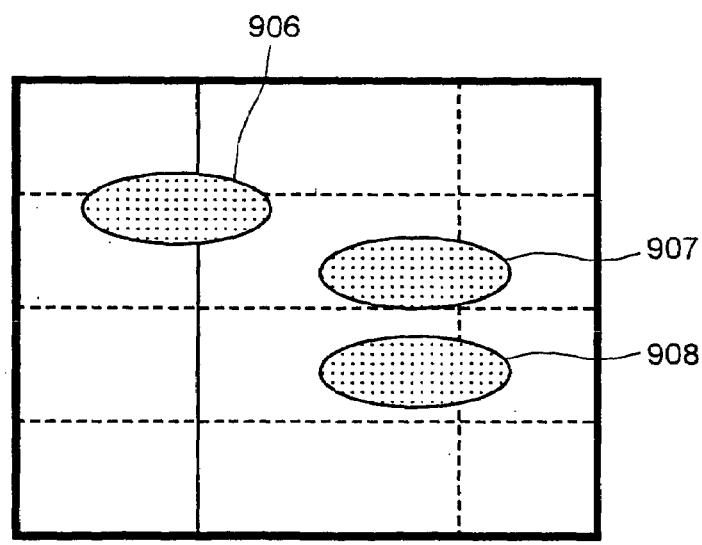
FIG. 15 illustrates an image captured by an imaging unit in the image processor illustrated in FIG. 14.

An operation of the image processor will be explained with reference to the flowchart illustrated in FIG. 13. The imaging section 1 captures the image of the inside of the elevator cage or the elevator hall, and the captured image is input to the face region extraction section 3 and the change area detection section 41 (step S21). The change area detection section 41 generates the differential image from the input image and the background image, detects the area having a change from the obtained differential image, and outputs the position information to the face region extraction section 3 (step S22). The face region extraction section 3 extracts a human face region, being an object, from the change area in the image input from the imaging section 1, based on the position information of the change area input from the change area detection section 41, and calculates the barycentric position (step S23).

Subsequently, processing the same as at steps S3 to S7 explained in the first embodiment referring to FIG. 8 is performed, to determine whether the passenger on the wheelchair is present in the target area, and the determination result is output to the external device (steps S24 to S28). In other words, when the image is captured, the distance to the object at each position in the image is estimated. The distance estimation area is set with respect to the human image having the extracted face region, and the distance distribution is calculated based on the distance data at each position measured in the distance estimation area. The barycentric position in the face region is compared with the calculated distance distribution in the distance data in the distance estimation area. As a result of comparison, when the barycentric position in the face region and the distance distribution in the distance data in the distance estimation area are present on the vertical line, the distance calculation section 34 determines that the person having the face region is a standing passenger, and when the barycentric position in the face region and the distance distribution in the distance data in the distance estimation area are not present on the vertical line, the distance calculation section 34 determines that the person having the face region is sitting on a wheelchair, and the distance calculation section 34 outputs the determination result to the external device and finishes the process.

The determination result output by the wheelchair presence determination section 6 is used for changing the operation mode of the elevator, for example, by the elevator controller, as in the first embodiment.

In the third embodiment, an example in which the distance estimation section 2 includes a device realized by the scanning type laser range filter or the like as in the first embodiment has been explained, however, the stereo image processing according to the twin-lens stereo method explained in the second embodiment may be used for the distance estimation section 2. In other words, instead of the distance estimation section 2 illustrated in FIG. 12, the second imaging section 31, the third imaging section 32 and the stereo calculation section 33, or the second imaging section 31 and the stereo calculation section 33 may be used.

A case in which the barycentric position in the face region is compared with the distance distribution in the distance estimation area for determination by the wheelchair presence determination section 6 relating to whether the passenger is standing or sitting on a wheelchair is explained. However, instead of the barycentric position, the horizontal distance from the imaging section 1 of the whole face region may be compared, as a representative point in the face region, with the distance distribution in the distance estimation area.

According to the third embodiment, since the area having a change is extracted, by generating a differential image from the image of the target area captured by the change area detection section 41 and the background image prepared beforehand, and the face region extraction section 3 extracts the face region in the extracted area having a change, there is the effect that the time for extracting the face region can be reduced. Further, such erroneous determination that an image pattern similar to a human face existing in the target area is determined as a human face can be suppressed, thereby enabling more accurate extraction of the face region.

According to one aspect of the present invention, the face region is extracted from the image of the target area, and the distance distribution from the imaging unit in the distance estimation area set below the face region by a predetermined distance is compared with the distance of the face region from the imaging unit, thereby to determine whether the person having the face region is sitting on a wheelchair. Therefore, there is the effect that the passenger on the wheel chair is recognized with high probability.

According to another aspect of the present invention, the change area detection unit is further provided, which generates a differential image from the image captured by the imaging unit and the background image in which an object in the target area is not present, and extracts the area having a change based on the generated differential image, and hence, there is the effect that the extraction time of the face region by the face region extraction unit can be reduced. Further, such erroneous determination that an image pattern similar to a human face existing in the target area is determined as a human face can be suppressed, thereby enabling more accurate extraction of the face region.

According to still another aspect of the present invention, since the scanning type laser range finder is used as the distance estimation unit, the distance from the imaging unit to the object existing in the target area can be accurately estimated.

According to still another aspect of the present invention, the change area detection unit is further provided, which generates a differential image from the image captured by the imaging unit and the background image in which an object in the target area is not present, and extracts the area having a change based on the generated differential image, and hence, there is the effect that the extraction time of the face region by the face region extraction unit can be reduced. Further, such erroneous determination that an image pattern similar to a human face existing in the target area is determined as a human face can be suppressed, thereby enabling more accurate extraction of the face region.

According to still another aspect of the present invention, since the stereo calculation unit measures the distance from the first imaging unit to the object existing at each position of the image captured by the first imaging unit, from two images in the target area captured by the second and the third imaging units, there is the effect that the distance from the first imaging unit to the object can be measured with a simple device configuration.

According to still another aspect of the present invention, the change area detection unit is further provided, which generates a differential image from the image captured by the first imaging unit and the background image in which an object in the target area is not present, and extracts the area having a change based on the generated differential image, and hence, there is the effect that the extraction time of the face region by the face region extraction unit can be reduced. Further, such erroneous determination that an image pattern similar to a human face existing in the target area is determined as a human face can be suppressed, thereby enabling more accurate extraction of the face region.

According to still another aspect of the present invention, since the stereo calculation unit measures the distance from the first imaging unit to the object existing at each position of the image captured by the first imaging unit, from the image of the target area captured by the first imaging unit, and the image of the target area captured by the second imaging unit horizontally spaced away from the first imaging unit, there is the effect that the distance from the first imaging unit to the object can be measured with a simple device configuration. Further, since the first imaging unit has a role to capture an image for extracting the face region in the target area and an image for measuring the distance between the first imaging unit and the object in the target area by the stereo method, there is the effect that the image processor in which the number of necessary imaging units is minimized can be created.

According to still another aspect of the present invention, the change area detection unit is further provided, which generates a differential image from the image captured by the first imaging unit and the background image in which an object in the target area is not present, and extracts the area having a change based on the generated differential image, and hence, there is the effect that the extraction time of the face region by the face region extraction unit can be reduced. Further, such erroneous determination that an image pattern similar to a human face existing in the target area is determined as a human face can be suppressed, thereby enabling more accurate extraction of the face region.

INDUSTRIAL APPLICABILTIY

The image processor according to the present invention is suitable for an elevator user detection system used for automatically changing over the operation mode of the elevator, when there is a person sitting on a wheelchair in the elevator cage or in the elevator hall.

The invention claimed is:

1. An image processor comprising:
an imaging unit that captures an image of a target area;
a face region extraction unit that extracts a face region, which corresponds to a face of a person, from the image captured by the imaging unit;
a distance estimation unit that estimates distance from the imaging unit to each position of the image captured by the imaging unit;
a distance distribution calculation unit that sets up a distance estimation area, in the image captured, below the face region by a predetermined distance and calculates distance distribution from the imaging unit in the distance estimation area, using the distance estimated by the distance estimation unit; and
a wheelchair presence determination unit that determines whether a person corresponding to the face region extracted is sitting in a wheelchair, by comparing the distance from the imaging unit of the face region estimated by the distance estimation unit with the distance distribution in the distance estimation area.

2. The image processor according to claim 1, further comprising a change area detection unit that generates a differential image of an image captured by the imaging unit, and a background image, which is an image of the target area when there is no one present in the target area, and extracts a change area, which corresponds to an area where there is a change, from the differential image, wherein the face region extraction unit extracts a face region from the change area extracted by the change area detection unit.

3. The image processor according to claim 1, wherein the distance estimation unit is a scanning laser range finder.

4. The image processor according to claim 3, further comprising a change area detection unit that generates a differential image of an image captured by the imaging unit, and a background image, which is an image of the target area when there is no one present in the target area, and extracts a change area, which corresponds to an area where there is a change, from the differential image, wherein the face region extraction unit extracts a face region from the change area extracted by the change area detection unit.

5. An image processor comprising:
a first imaging unit that captures an image of a target area;
a second imaging unit and a third imaging unit which capture respective images of the target area, wherein the second imaging unit is spaced horizontally from the third imaging unit by a predetermined distance;
a face region extraction unit that extracts a face region, which corresponds to a face of a person, from the image captured by the first imaging unit;
a stereo calculation unit that estimates a distance from the first imaging unit to each position of the image captured by the first imaging unit by a stereo method, based on the respective images captured by the second imaging unit and the third imaging unit;
a distance distribution calculation unit that sets up a distance estimation area below the human face region by a predetermined distance and calculates distance distribution from the first imaging unit in the distance estimation area, using the distance estimated by the stereo calculation unit; and
a wheelchair presence determination unit that determines whether a person having the face region is sitting in a wheelchair, by comparing the distance from the first imaging unit of the face region estimated by the stereo calculation unit with the distance distribution in the distance estimation area.

6. The image processor according to claim 5, further comprising a change area detection unit that generates a differential image of an image captured by the imaging unit, and a background image, which is an image of the target area when there is no one present in the target area, and extracts a change area, which corresponds to an area where there is a change, from the differential image, wherein the face region extraction unit extracts a face region from the change area extracted by the change area detection unit.

7. An image processor comprising:
a first imaging unit that captures an image of a target area;
a second imaging unit that captures an image of the target area, wherein the second imaging unit is spaced horizontally from the first imaging unit by a predetermined distance;
a face region extraction unit that extracts a face region, which corresponds to a face of a person, from the image captured by the first imaging unit;
a stereo calculation unit that estimates a distance from the first imaging unit to each position of the image captured by the first imaging unit by a stereo method, based on the respective images captured by the first imaging unit and the second imaging unit;
a distance distribution calculation unit that sets up a distance estimation area below the human face region by a predetermined distance and calculates distance distribution from the first imaging unit in the distance estimation area, using the distance estimated by the stereo calculation unit; and
a wheelchair presence determination unit that determines whether a person having the face region is sitting in a wheelchair, by comparing the distance from the first imaging unit of the face region estimated by the stereo calculation unit with the distance distribution in the distance estimation area.

8. The image processor according to claim 7, further comprising a change area detection unit that generates a differential image of an image captured by the imaging unit, and a background image, which is an image of the target area when there is no one present in the target area, and extracts a change area, which corresponds to an area where there is a change, from the differential image, wherein the face region extraction unit extracts a face region from the change area extracted by the change area detection unit.

* * * * *